H. H. VAUGHAN.
LOCOMOTIVE FEED WATER HEATER.
APPLICATION FILED SEPT. 20, 1913.
1,270,899.
Patented July 2, 1918.
3 SHEETS—SHEET 3.
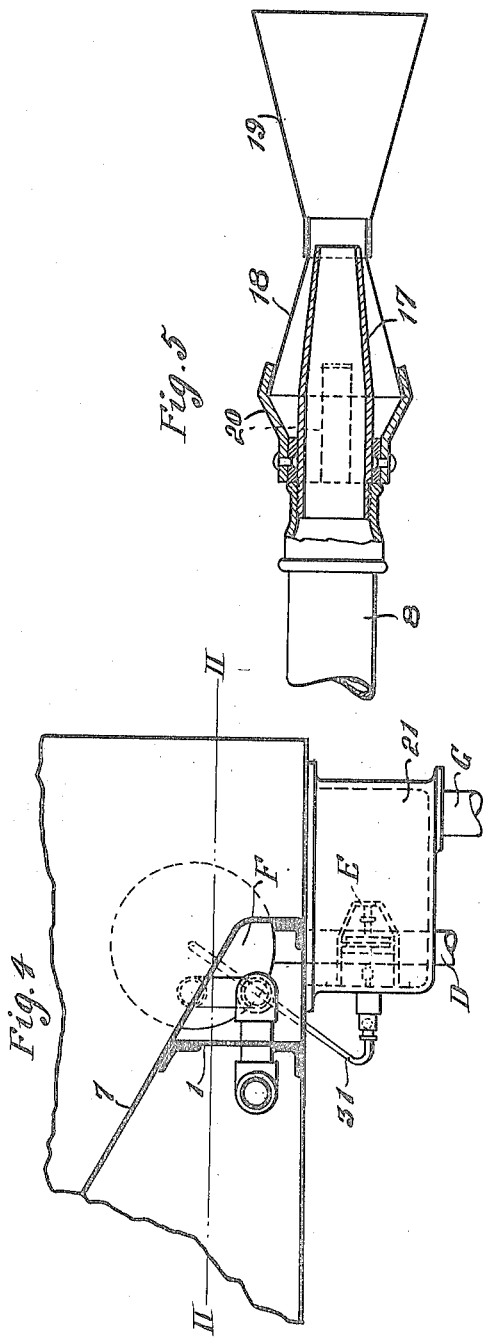
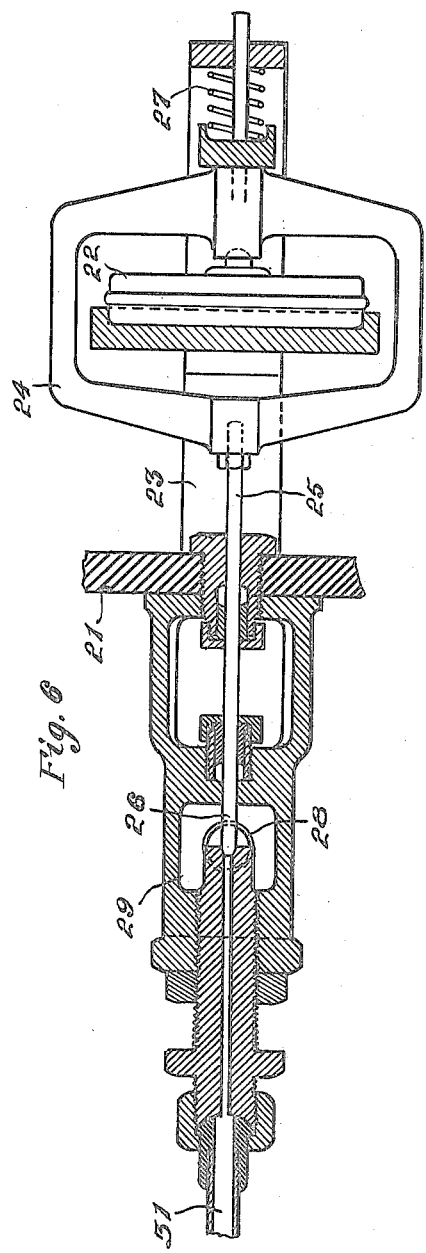

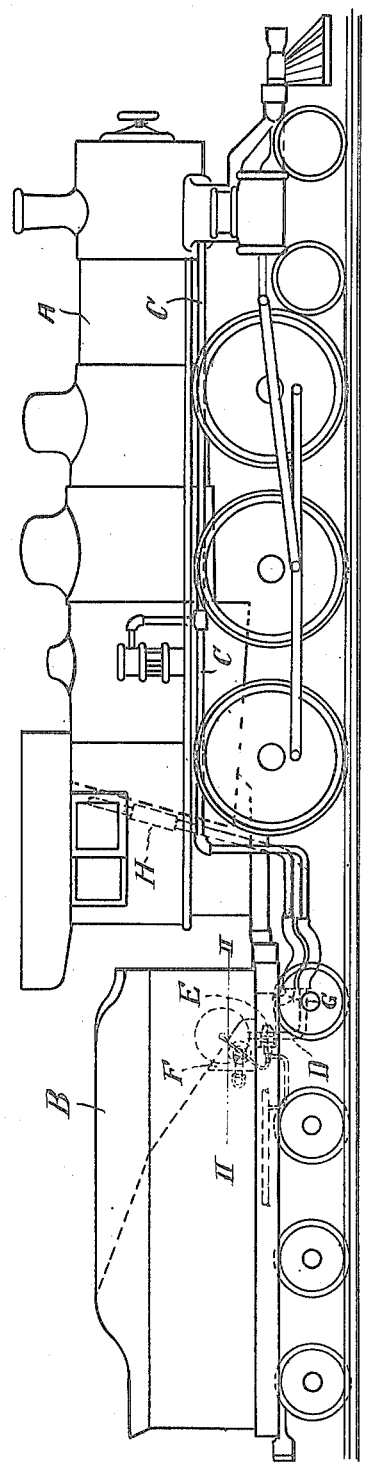

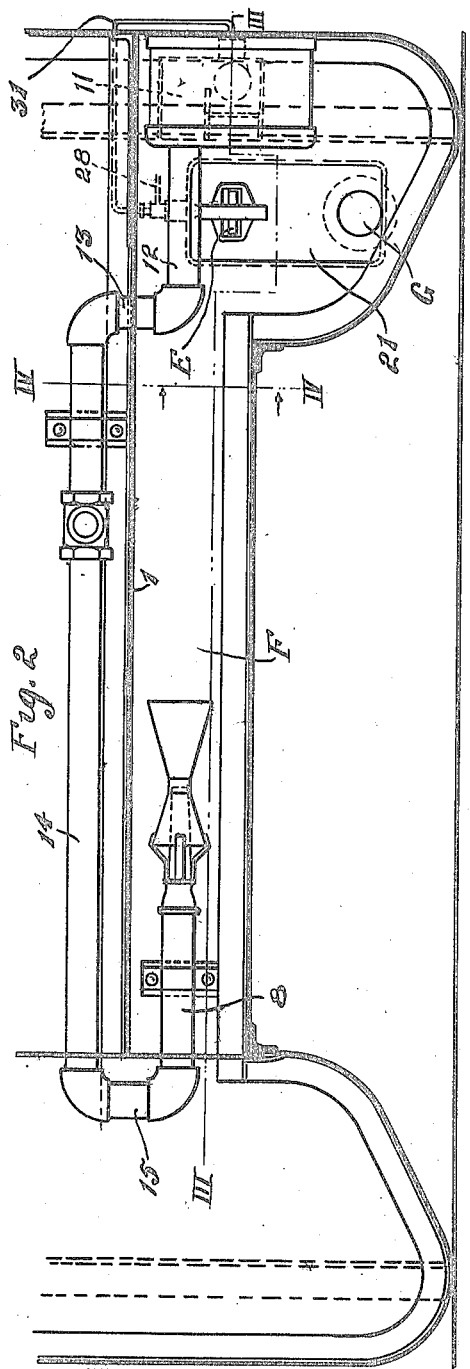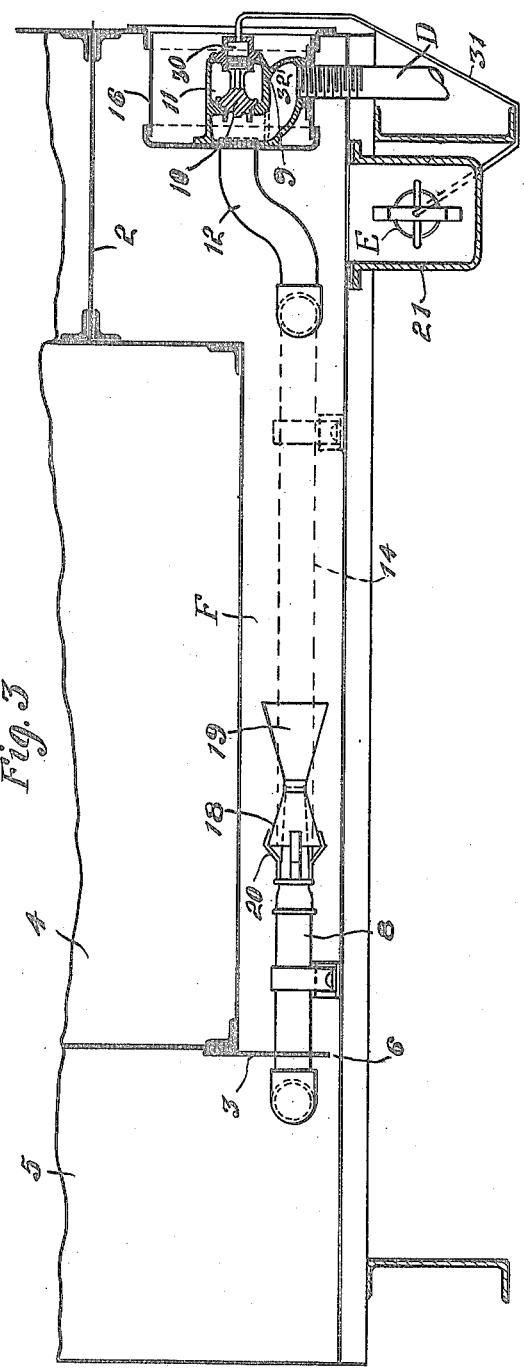

UNITED STATES PATENT OFFICE.

HENRY H. VAUGHAN, OF MONTREAL, CANADA, ASSIGNOR OF ONE-THIRD TO LE GRAND PARISH, OF NEW YORK, N. Y., AND ONE-THIRD TO THORWALD E. GRAHN, OF CLEVELAND, OHIO.

LOCOMOTIVE-FEED-WATER HEATER.

1,270,899.   Specification of Letters Patent.   Patented July 2, 1918.

Application filed September 20, 1913. Serial No. 790,845.

*To all whom it may concern:*

Be it known that I, HENRY H. VAUGHAN, a citizen of the United States, residing at Montreal, in the Dominion of Canada, have invented certain new and useful Improvements in Locomotive-Feed-Water Heaters, of which the following is a specification.

The invention relates to feed-water heaters, and in its preferred embodiment to feed-water heaters for locomotives. The invention has for its objects, the provision of an improved arrangement of the supplemental heating tank or compartment as applied to a tender; the provision of an arrangement of thermostatic controlling means wherein a more certain and direct control of the steam for heating the water is secured; and the provision of improved means whereby the pressure in the pipe supplying steam to the heating tank is reduced. One embodiment of the invention is illustrated in the accompanying drawings, wherein—

Figure 1 is a side elevation of a locomotive and tender provided with my improved feed-water heating means; Fig. 2 is a horizontal section taken on the lines II—II of Figs. 1 and 4; Fig. 3 is a vertical section on the line III—III of Fig. 2; Fig. 4 is a vertical section longitudinal of the tender, on the line IV—IV of Fig. 2, looking in the direction of the arrows, and Figs. 5 and 6 are enlarged detail sectional views of the nozzle and thermostatic devices employed.

In order to provide for the rapid and economical heating of a relatively small portion of the water in the tender, a heating compartment is provided which is walled off from the main body of water in the tender, but in communication therewith, so that fresh water may be supplied to the compartment as the heated water is withdrawn by the locomotive injectors. According to my present invention this heating compartment is preferably arranged transversely of the tender at the front end thereof, and lies beneath the inclined floor of the coal compartment. The heating medium is preferably exhaust steam from the locomotive cylinders and the pumps, although live steam might be employed if desired. In the preferred embodiment of the invention the steam for heating the water in the heating tank is supplied to one end of such tank by means of a pressure reducing nozzle, and the heated water is withdrawn from the other end of such heating tank, the thermostatic means for governing the supply of steam to the heating compartment being located in a well which constitutes a portion of the passageway leading to the injectors. This arrangement insures a rapid and positive actuation of the thermostatic controlling means, and this in turn gives a closer regulation of the temperature of the water and a more reliable operation of the injectors.

Referring first to the general arrangement of parts as shown in Fig. 1, A and B are the locomotive and tender respectively to which the apparatus is illustrated as applied; C is the pipe for conducting the exhaust steam from the cylinders and from the pump to the tender; D is the pipe carried by the tender, to which the steam pipe C is connected; E is the thermostatic means for governing the supply of steam to the water of the tender; F is the heating compartment extending transversely of the front portion of the tender to which the steam from the pipe D is supplied; and G is the hot water outlet pipe leading from the heating compartment F to the injector H.

The construction and location of the compartment F will be understood by reference to Figs. 2, 3, and 4. By reference to these figures it will be seen that this portion of the water tank is walled off from the other portions of the tank, by means of the plates 1, 2, and 3 (Figs. 2 and 3), plate 1 serving to close the rear side of the tank and the plate 3 serving to partially close the left hand end of the tank. The compartments 4 and 5 of course carry the main body of water in the tank, and free communication is afforded between the compartment 5 and the compartment F by means of the passageway 6 beneath the edge of the plate 3. The foregoing arrangement provides for a heating tank of relatively small area, and one which can be installed at a small cost upon the ordinary type of tender, inasmuch as the utilization of the space beneath the inclined floor 7 (Fig. 4) of the coal compartment reduces the number of additional walls necessary to close off the compartment F, to a minimum.

Steam is supplied to a pipe 8 extending longitudinally of the heating compartment F (Figs. 2 and 3) from the supply pipe D. Steam from this pipe D passes up through the valve casing 9, past the valve 10, to a compartment 11 with which the pipe 12 communicates, and thence to the pipe 8 via the pipe sections 13, 14, and 15 (Fig. 2). The valve 10 is controlled thermostatically in a manner to be hereinafter described, and the casing 9 carrying the valve 10 is inclosed in a box 16 of sheet metal set into the compartment F.

In order to reduce the back pressure in the steam pipe 8 the nozzle construction shown in enlarged section in Fig. 5 is employed. The end of the pipe 8 is provided with a converging nozzle 17, and inclosing this nozzle 17 are pair of oppositely converging nozzles 18 and 19, the nozzle 18 being supported by means of the brackets 20, so that free access of water to the rear end of the nozzle 18 is provided. The outer surface of the nozzle 17 is spaced away from the interior surface of the nozzle 18, so that a flow of water may occur through the annular space thus provided. This nozzle I have found operates upon the injector principle and serves to materially reduce the back pressure in the pipe 8 incident to the forcing of the steam into the water of the heating compartment. The apparatus just described tends to force the water in the reduced portion of the tank F longitudinally thereof toward the enlarged portion at the right hand end of such compartment, thus tending to increase the pressure in such portion of the compartment from which the heated water is withdrawn. As a result the operation of the injector is assisted to a greater or less degree. A well 2 is secured to the bottom plate of the compartment, such well being provided with the outlet pipe G (Figs. 1, 2, and 4) leading to the injector H.

In the well 21 is located the thermostatic controlling device E shown in enlarged section in Fig. 6, such themostatic controlling means being designed to operate the valve 10 for controlling the supply of steam to the heating compartment F. In the form of apparatus as illustrated in Fig. 6 the expansible member consists of a box 22 carried by a supporting bracket 23 and adapted to secure the reciprocation of the yoke 24 and the valve operating stem 25 carried thereby, the valve 26 at the end of the stem 25 being normally held closed by the spring 27 when the temperature of the water in the compartment F is below a predetermined point. A pressure supply pipe 28 leading from any desired source of air pressure supplies air to the chamber 29 when the valve 26 is unseated, and this chamber 29 communicates with the cylinder 30 (Fig. 3) by means of the pipe 31. Mounted in the cylinder 30 is the piston 32 connected by means of the stem shown, to the valve 10. When the temperatue of the water in the well rises above the predetermined point for which the thermostat is set, the expansion of the liquid in the box 22 causes the yoke 24 and the stem 25 carried thereby to move to the right, thereby opening the valve 26 and permitting pressure from the supply pipe 28 to pass to the cylinder 30, moving the valve 10 to closed position and shutting off the supply of steam to the heating compartment F.

The location of the thermostatic controlling means in the well 21 and in effect in the passageway leading from the heating compartment to the injector, has been found to be advantageous in that the operation of the thermostat is more rapid and positive than where the thermostatic controlling means is located in the heating compartment itself. This is due to the fact that the thermostat is located in the line of flow so that it is acted upon promptly by the hot water at substantially the temperature at which such water is to be used in the injector, the thermostat at the same time by reason of its position being protected from the direct impact of the liquid from the inlet nozzle. The arrangement has the further advantage that the thermostat is more accessible than if it were located in the body of the heating compartment F, the well or pocket 21 being readily removed when it is desired to adjust or replace the parts of the thermostat. A similar advantage is incident to the placing of the valve casing 9 in the pocket 16, the valve casing being readily accessible in such position, and at the same time being out of the way. Other advantages incident to the construction will be apparent to those skilled in the art.

What I claim is:

1. In combination in a tender having a coal compartment with a downwardly inclined bottom and water compartments at the sides of and beneath the said coal compartment, a heating compartment beneath the said inclined bottom at the front end thereof and extending transversely of the tender, means for supplying steam to the said heating compartment, a communication for supplying water to the said heating compartment from the other water compartments, and means for conducting the heated water from said heating compartment.

2. In combination in a tender having a coal compartment with a downwardly inclined bottom and water compartments at the sides of and beneath the said coal compartment, a heating compartment beneath the said inclined bottom at the front end thereof and extending transversely of the tender, means for supplying steam to the said heating compartment adjacent one end thereof, a communication for supplying water to the said heating compartment at the said end from the other water compartments, a well adjacent the opposite end of said heating compartment, and a water outlet pipe leading from said well.

3. In combination with a heater having a coal compartment with a downwardly inclined bottom and water compartments at the sides of and beneath the said coal compartments, a heating compartment beneath the said inclined bottom at the front end thereof and extending transversely of the tender, means for supplying steam to the said heating compartment, a passageway between one end of the heating compartment and an adjacent water compartment, means for supplying steam into the heating compartment in the direction of the other end of said heating compartment, and an outlet pipe leading from said other end of the heating compartment.

4. In combination in a tender having a coal compartment with a downwardly inclined bottom and water compartments at the sides of and beneath the said coal compartment, a heating compartment having a portion of relatively small cross sectional area beneath the said inclined bottom at the front end thereof, and a portion of larger diameter at the end adjacent the side of the tender, means for supplying steam longitudinally of the portion of the heating compartment having the smaller cross sectional area and toward the enlarged portion of the compartment, a communication for supplying water to the heating compartment from an adjacent compartment, and an outlet leading from the enlarged portion of the compartment.

5. In combination in feed water heating apparatus, a compartment having a portion of relatively small cross sectional area and a portion of larger cross sectional area, a steam supply pipe leading into the compartment adjacent the smaller end thereof, and a pair of conical nozzles connected at their reduced ends and fitting over the end of the said steam supply pipe with such end adjacent the reduced portions of the nozzles but spaced away therefrom.

In testimony whereof I have signed my name to the specification in the presence of two witnesses.

HENRY H. VAUGHAN.

Witnesses:
GORDON G. COOKE,
WILLIAM J. C. HEWETSON.